(12) United States Patent
Laird

(10) Patent No.: US 10,142,577 B1
(45) Date of Patent: Nov. 27, 2018

(54) COMBINATION REMOTE CONTROL AND TELEPHONE

(71) Applicant: Noble Laird, Mastic Beach, NY (US)

(72) Inventor: Noble Laird, Mastic Beach, NY (US)

( * ) Notice: Subject to any disclaimer, the term of this patent is extended or adjusted under 35 U.S.C. 154(b) by 0 days.

(21) Appl. No.: 14/667,284

(22) Filed: Mar. 24, 2015

Related U.S. Application Data

(60) Provisional application No. 61/967,617, filed on Mar. 24, 2014.

(51) Int. Cl.
*H04N 5/44* (2011.01)
*H04N 5/445* (2011.01)
(Continued)

(52) U.S. Cl.
CPC ............ *H04N 5/4403* (2013.01); *H04B 1/40* (2013.01); *H04N 5/44582* (2013.01); *H04N 21/4122* (2013.01); *H04N 21/4126* (2013.01); *H04N 21/41407* (2013.01); *H04N 21/4222* (2013.01); *H04N 21/42203* (2013.01); *H04N 21/42208* (2013.01); *H04N 21/42212* (2013.01);
(Continued)

(58) Field of Classification Search
CPC ............ H04N 5/4401; H04N 21/4122; H04N 5/44582; H04N 21/4126; H04N 21/41407; H04N 21/42203; H04N 21/42208; H04N 21/42212; H04N 21/42221; H04N 21/42222; H04N 21/42224; H04N 2005/441; H04N 2005/4416; H04N 2005/4425; H04N 2005/44265; H04N 2005/4428; H04N 2005/443; H04N 2005/4432; H04N 21/4222; H04W 4/80; H04B 1/40
USPC ........................................................ 348/552
See application file for complete search history.

(56) References Cited

U.S. PATENT DOCUMENTS

2007/0182595 A1 * 8/2007 Ghasabian ............ G06F 1/1615
341/22
2007/0192595 A1 * 8/2007 DaCosta ................. G06F 21/14
713/165
(Continued)

*Primary Examiner* — Jefferey F Harold
*Assistant Examiner* — Sihar A Karwan
(74) *Attorney, Agent, or Firm* — Alfred M. Walker; Harvey Lunenfeld

(57) ABSTRACT

A handheld combination television remote control and wireless telephone apparatus, comprising: a microprocessor; an infrared remote control transceiver; a wireless telephone transceiver; a Wi-Fi and Bluetooth transceiver; microphone, loud speaker, power source, and housing; a combination television remote control and telephone alphanumeric keypad and/or touch screen display communicating with the microprocessor to direct the handheld combination television remote control and wireless telephone apparatus to communicate with a remote television, remote set top box, wireless telephone system provider, wireless network, Bluetooth device, and base station combination television remote control and wireless telephone apparatus and: switch the handheld combination television remote control and wireless telephone apparatus from television mode to telephone mode and vice versa; control the remote television and/or remote set top box; control remote television and/or remote set top box settings and retrieve information therefrom; originate and/or receive telephone calls; transmit and/or receive internet information via the wireless network.

4 Claims, 8 Drawing Sheets

(51) Int. Cl.
*H04N 21/414* (2011.01)
*H04N 21/41* (2011.01)
*H04N 21/422* (2011.01)
*H04B 1/40* (2015.01)
*H04W 4/80* (2018.01)

(52) U.S. Cl.
CPC . *H04N 21/42221* (2013.01); *H04N 21/42222* (2013.01); *H04N 21/42224* (2013.01); *H04W 4/80* (2018.02); *H04N 2005/441* (2013.01); *H04N 2005/443* (2013.01); *H04N 2005/4416* (2013.01); *H04N 2005/4425* (2013.01); *H04N 2005/4426* (2013.01); *H04N 2005/4428* (2013.01); *H04N 2005/4432* (2013.01)

(56) References Cited

U.S. PATENT DOCUMENTS

2012/0069131 A1* 3/2012 Abelow ............... G06Q 10/067
　　　　　　　　　　　　　　　　　　　　348/14.01
2014/0176812 A1* 6/2014 Kim ....................... G08C 17/02
　　　　　　　　　　　　　　　　　　　　348/734

* cited by examiner

COMBINATION REMOTE CONTROL AND TELEPHONE

This application claims the benefit of U.S. Provisional Application No. 61/967,617, filed Mar. 24, 2014, the full disclosure of which is incorporated herein by reference. The above referenced document is not admitted to be prior art with respect to the present invention by its mention herein.

BACKGROUND OF THE INVENTION

Field of the Invention

The present invention relates generally to remote controls and telephones and more particularly to combination remote controls and telephones.

Background Art

In today's modern times people multitask and often have the need to use different devices at the same time. In certain instances, for example, people might have several different television remote controls to watch television and control different set top boxes and also have the need make and receive phone calls, while watching television.

In order to minimize the number of devices for controlling and watching television and for making and receiving phone calls at the same time, a handheld wireless and/or infrared combination remote control and telephone apparatus is needed. The handheld combination remote control and telephone apparatus should have all the functionality of both a remote control, telephone, and wireless network apparatus.

The handheld combination remote control and telephone apparatus should be capable of: controlling a remote television and/or a remote set top box; controlling remote television and/or remote set top box settings and retrieving information therefrom; originating and/or receiving telephone calls; transmitting and/or receiving internet information via a wireless network, and switching from television mode to telephone mode and vice versa.

Handheld television remote controls and wireless telephones have been known. However, none of the handheld television remote controls, wireless telephones, and the like adequately satisfies these aforementioned needs.

OBJECTS OF THE INVENTION

A primary objective of the present invention is to provide a combination remote control and telephone apparatus having functions combined into one apparatus providing the ability to make or answer incoming calls with an apparatus normally used as a television remote.

Another objective of the present invention is to provide a combination remote control and telephone apparatus having combined functions into one apparatus, thereby enhancing the versatility of both the present television remote and the present wireless phone.

Another objective of the present invention is to provide a combination remote control and telephone apparatus having functions combined into one apparatus, thereby enhancing the versatility of the present wireless phone.

Further benefits and advantages of the present invention will become apparent after a careful reading of the detailed description with appropriate reference to the accompanying drawings.

SUMMARY

The present invention is directed to a handheld combination television remote control and wireless telephone apparatus, comprising:
  a microprocessor comprising embedded firmware;
  an infrared remote control transceiver;
    an infrared radiator and an infrared sensor, each connected to the infrared remote control transceiver;
  to a wireless telephone transceiver;
    a wireless telephone antenna connected to the wireless telephone transceiver;
  a Wi-Fi and Bluetooth transceiver;
    a Wi-Fi and Bluetooth antenna connected to the Wi-Fi and Bluetooth transceiver;
  a combination television remote control and telephone keypad communicating with the microprocessor;
  a touch screen display communicating with the microprocessor;
  a microphone communicating with the microprocessor;
  a loud speaker, the microprocessor communicating with the loud speaker;
  a power source powering the microprocessor, the infrared remote control receiver, the wireless telephone transceiver, and the Wi-Fi and Bluetooth transceiver;
  a housing,
    the microprocessor, the infrared remote control transceiver, the wireless telephone transceiver, the Wi-Fi and Bluetooth transceiver, and the power source within the housing;
    the combination television remote control and telephone keypad and the touch screen display mounted to the housing and accessible from the exterior of the housing;
  the touch screen display and the combination television remote control and telephone keypad, which comprises television remote control keypad keys and telephone alphanumeric keypad keys, communicate with the microprocessor to direct the handheld combination television remote control and wireless telephone apparatus to communicate with a remote television, remote set top box, a wireless telephone system provider, a wireless network, a Bluetooth device, and a base station combination television remote control and wireless telephone apparatus and:
    switch the handheld combination television remote control and wireless telephone apparatus from television mode to telephone mode and vice versa;
    control the remote television and/or the remote set top box;
    control remote television and/or remote set top box settings and retrieve information therefrom;
    originate and/or receive telephone calls;
    transmit and/or receive internet information via the wireless network.

In a preferred embodiment of the present invention, a combination television remote control and wireless telephone system, comprises:
  a handheld combination television remote control and wireless telephone apparatus and a base station combination television remote control and wireless telephone apparatus;
  the handheld combination television remote control and wireless telephone apparatus, comprising:
  a microprocessor comprising embedded firmware;
  an infrared remote control transceiver;

to an infrared radiator and an infrared sensor, each connected to the infrared remote control transceiver;
a wireless telephone transceiver;
   a wireless telephone antenna connected to the wireless telephone transceiver;
a Wi-Fi and Bluetooth transceiver;
   a Wi-Fi and Bluetooth antenna connected to the Wi-Fi and Bluetooth transceiver;
a combination television remote control and telephone keypad communicating with the microprocessor;
a touch screen display communicating with the microprocessor;
a microphone communicating with the microprocessor;
a loud speaker, the microprocessor communicating with the loud speaker;
a power source powering the microprocessor, the infrared remote control receiver, the wireless telephone transceiver, and the Wi-Fi and Bluetooth transceiver;
a housing,
   the microprocessor, the infrared remote control transceiver, the wireless telephone transceiver, the Wi-Fi and Bluetooth transceiver, and the power source within the housing;
   the combination television remote control and telephone keypad and the touch screen display mounted to the housing and accessible from the exterior of the housing;
the touch screen display and the combination television remote control and telephone keypad, which comprises television remote control keypad keys and telephone alphanumeric keypad keys, communicating with the microprocessor to direct the handheld combination television remote control and wireless telephone apparatus to communicate with a remote television, a remote set top box, a wireless telephone system provider, a wireless network, a Bluetooth device, and the base station combination television remote control and wireless telephone apparatus and:
   switch the handheld combination television remote control and wireless telephone apparatus from television mode to telephone mode and vice versa;
   control the remote television and/or the remote set top box;
   control remote television and/or remote set top box settings and retrieve information therefrom;
   originate and/or receive telephone calls;
   transmit and/or receive internet information via the wireless network;
the base station combination television remote control and wireless telephone apparatus communicating with a telephone system provider;
the base station combination television remote control and wireless telephone apparatus, comprising:
another microprocessor comprising other embedded firmware;
another wireless telephone transceiver;
   another wireless telephone antenna connected to the other wireless telephone transceiver;
a telephone message recorder, the other microprocessor communicating with the telephone message recorder;
a handheld combination television remote control battery charger;
a handheld combination television remote control and wireless telephone apparatus locator communicating with the handheld combination television remote control and wireless telephone apparatus;
another touch screen display communicating with the other microprocessor;
another microphone communicating with the other microprocessor;
another loud speaker, the other microprocessor communicating with the other loud speaker;
another power source powering the other microprocessor and the other wireless telephone transceiver;
another housing,
   the other microprocessor, the other wireless telephone transceiver, the
   telephone message recorder, and the other power source within the housing;
   the other touch screen display mounted to the other housing and accessible from the exterior of the other housing;
   the other touch screen display communicating with the microprocessor to direct the base station combination television remote control and wireless telephone apparatus to communicate with the remote television, the telephone system provider and the handheld combination television remote control and wireless telephone apparatus and originate and/or receive telephone calls.

In accordance with the present invention, there is provided a combination remote control and telephone apparatus, combining functions of a portable, handheld remote control for operating a television or other video display screen, with a wireless telephone apparatus, comprising a combination remote control and telephone, including, with a duality of functions having an appearance of a TV television remote control handset and/or base station, but fully capable of acting as a wireless phone.

The remote control functions of a remote control for television and other visual displays, is combined with that of a land line wireless phone, with a control key 1 indicated as TR, which is used to transform the combined remote control and telephone, from a land line wireless telephone to a television remote control and vice versa. The TR function key 1, once pressed turns the television remote control handset into a land line handset wireless phone. Upon completion of the call the combination remote control and telephone reverts back to its default state which is as a remote control for television or other visual displays, in one of three reversion ways as follows:
1. clearing by user by pressing the TR key a second time;
2. pressing the on/off key; or,
3. placing the combination remote control and telephone apparatus back into its respective base unit, which is equivalent to hanging up a conventional land line phone.

The combination remote control and telephone is by description a wireless land line telephone that doubles as a television or other visual display remote control. The combination remote control and telephone can operate multiple televisions or the user can have one for each room, with each having the ability to function independently of the other(s). Each combination remote control and telephone can have its own respective base station unit with charging and other capabilities, or can have either a charging sub unit or an accessory charger.

For example, in a preferred option, the charging support base is provided as a charging base station for the combination portable, handheld remote control and telephone, (for operating a television or other video display screen) but with the additional function of the base station itself acting as telephone itself, by virtue of having both speaker phone electronics and a video display, with touch screen capabilities. Therefore, if the combination portable, handheld remote control and telephone is misplaced, lost under couch pillows, or is inadvertently carried and moved or left in a different room of a residence, the user can access the speaker telephone function of the base station, which also contains an audio microphone, as well as the touch screen and video display, so that the base station can act as a speakerphone to make a telephone call, in the absence of the combination portable, handheld remote control handset.

When a user is watching television, a conventional caller identification of an incoming telephone call is displayed on the television or other large video display screen, then wirelessly at the user's touch of a specified phone access button on the portable, handheld remote control, the portable the handheld remote control handset switches to a telephone mode, directly connecting the user to the incoming telephone call identified by the caller identification sub-display indicated on the television or other large video display screen. Therefore, when the caller ID is shown on the television screen, instead of just being a passive caller ID identification display, a signal is sent wirelessly to the combination remote control and telephone, allowing the user to connect to the identified telephone number identified by caller ID on the television screen.

Likewise, if the portable handheld remote control unit is misplaced or is in another room, when the user is watching television, and sees a conventional caller identification of an incoming telephone call being displayed on the television or other large video display screen, then wirelessly at the user's touch of a finger touch activated specified phone access region on the display/touch screen of the base support unit, the base station then functions as a speakerphone, when the support base station switches to a telephone mode, thereby directly connecting the user to the incoming telephone call identified by the caller identification sub-display indicated on the television or other large video display screen, that is typically used for operating the television or other video display screen.

It is further noted that even if the user has access to the portable, handheld remote control, instead of using the earpiece and mouthpiece provided on the portable remote control unit and telephone handset, when the user is watching television, and sees the conventional caller identification of the incoming telephone call being displayed on the television or other large video display screen, then wirelessly at the user's touch of a specified phone access button on base station, the base station switches to a telephone speaker phone mode, directly connecting the user to the incoming telephone call identified by the caller identification sub-display indicated on the television or other large video display screen.

In another alternate mode, if the handheld remote is misplaced or is left in another room, by using the touch screen, the user can switch back to the remote control mode in the base station, and use the touch screen of the base station as a television remote control, with all of the options of switching channels, accessing on demand shows, adjusting volume or muting the sound, recording with DVR functions, etc.

In a further alternate embodiment, what the user sees on either the display screen of the handheld remote control handset or on the display/touch screen of the base station, can be projected visually by the handheld remote control unit or by the base onto a wall or large projection screen as a large projected image.

Both the base station and the handset of the combination remote control and telephone preferably have a visual display/touchscreen, which is capable of displaying icons for various apps to be used by the user. The visual display/touch screen may be toggled from the television screen, whereby the user can watch live or recorded television programs from the base station's unit visual display/touch screen, which normally functions as a numbers key pad screen used to program the combination remote control and telephone (in either embodiment as a portable handset or as the user manipulatable speaker phone base station) and the television or other large wall mounted or free standing visual display device, and is the default screen. An optional third screen may be provided to display the incoming caller ID that appears automatically with an incoming call on a television screen. The third screen may be a separate LCD screen, or may be superimposed as a smaller screen superimposed over the larger screen.

In a further alternate embodiment, a handset support brace may be embedded into the receiving bed of the base station, which is available for use as a stand to hold the handset of the combination remote control and telephone in place, when it is being used as a projector, to project the aforementioned moving or still images upon a wall of the user's residence or office, to project movies, shows or other entertainment or educational programming, as well as to project Power Point presentations. In this projector embodiment, the back of the handset of the combination remote control and telephone can be used as a screen projector, preferably allowing the user to enlarge or reduce the size of the picture being projected upon the wall or auxiliary projection screen. The user can scale the screen size proportionately so as to fill an entire wall, giving the virtual reality effect that the user is located figuratively in the projected scene.

In a further alternate embodiment, the base station of the combination remote control and telephone can also be provided with an AM/FM radio therein, to be listened to by the user.

Additionally, the user can answer the telephone using the base unit as a speaker phone, without the handset of the combination remote and telephone, by simply touching the visual display/touchscreen to answer a incoming call, or pressing a control button (hereinafter referred to as a "TR button") to obtain a dial tone to make a telephone call out from the base station acting as a speakerphone.

It is noted that the TR Button, which is located on the combination remote control and telephone handset, and preferably optionally on the base station, is pressed on the handset, or on the speakerphone visual display/touchscreen, to operate the handset or optionally the base unit as a speaker phone.

Examples of Pre-Existing Problems and Solutions

The combination remote control and handset of the present invention is configured to solve ergonomic problems of a television remote control use. In problem Example 1, a caller ID flashes across the screen indicating that a phone call is coming in on the land line. While this is alerting to the user, this transitory caller ID display is not helpful, because even if the user wants to answer the phone, if it was not close at hand, the user could not. The only thing in hand may be the television remote. The present invention allows the user to use the remote to answer the incoming call using the television remote control.

In problem Example 2, too many remote controls are provided for various devices now. Many homes have many different remote controls now and few know what devices they each go to. DVR remotes and cable TV remotes may be located haphazardly and include extra devices, such as remote controls for DVR's, DVD's and cable TV's both past and present. There may also be too many discarded phones, both wireless and cellular.

Solution

A solution is to simplify the task of accessing a remote control and a telephone by combining them together, and preferably optionally in combination with a charging support base, that can itself also optionally act as a remote control via use of a touch screen provided thereon, and as a telephone, also via use of the touch screen display provided thereon. The present invention provides convenience. The advantage for the user is that by simply pressing a designated button (or designated region of the touch screen provided on the remote control or on the charging base station), marked by an indicia, such as, for example, "TR", which is configured to change the TV remote control into a telephone, this allows the user the ability to begin speaking into the remote control as if it were a wireless telephone. Calls will no longer be missed for lack of a phone nearby, nor because of an inability to read the transitory caller ID phone number, or because of because of the displayed caller ID number not appearing on the screen long enough. There is no need to search for a pen, a piece of paper or eyeglasses, in order to see who is calling. There is also no need to try repeating the number over and over, in an attempt to memorize it, while rushing to find the nearest cell phone or land line phone. All duplicate phones and remotes can be dispensed with, since the combination TV remote control and telephone not only serves as a TV, cable and DVR remote, but also serves the dual purpose of a telephone as well.

Because of the universal habit of keeping a remote control in hand, or relatively close by, while watching TV, users are more likely to be watching the TV with the remote in hand than a cell phone or a land line phone. With the present invention of the combination remote control and telephone, the next time the user is sitting there clicking through the channels and a caller ID appears on the television screen, the user simply presses the button or designated touch screen region on the remote control or on the charging base station, designed on the TV remote, puts the combination remote control and telephone to the user's ear, or listens through the speaker phone of the charging base station, and says, "Hello".

DRAWINGS

These and other features, aspects, and advantages of the present invention will become better understood with regard to the following description, appended claims, and accompanying drawings where:

Figure 1:
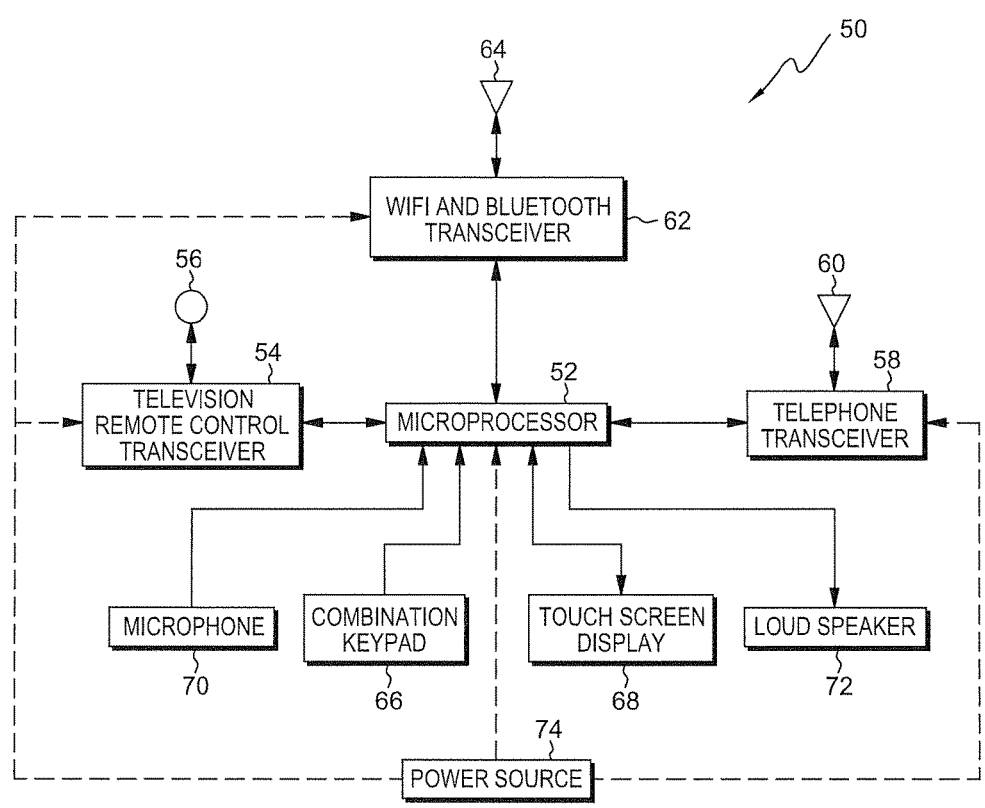
FIG. 1 is a block diagram of a handheld combination television remote control and wireless telephone apparatus, constructed in accordance with the present invention.
Figure 2:
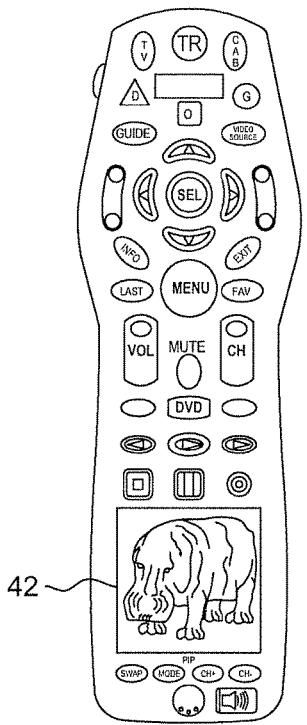
FIG. 2 is a front view of an embodiment of the handheld combination television remote control and wireless telephone apparatus of FIG. 1, showing a touch screen display displaying video.
Figure 3:
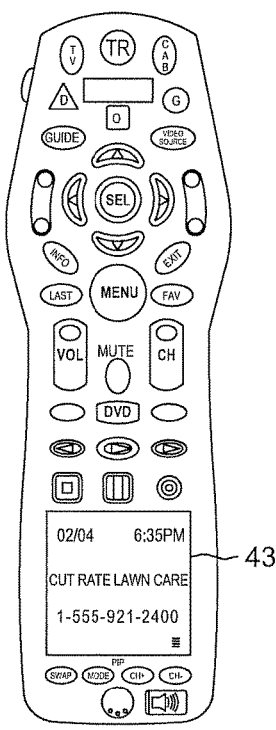
FIG. 3 is a front view of the embodiment of the handheld combination television remote control and wireless telephone apparatus of FIG. 1, showing a touch screen display displaying an incoming telephone call.
Figure 4:
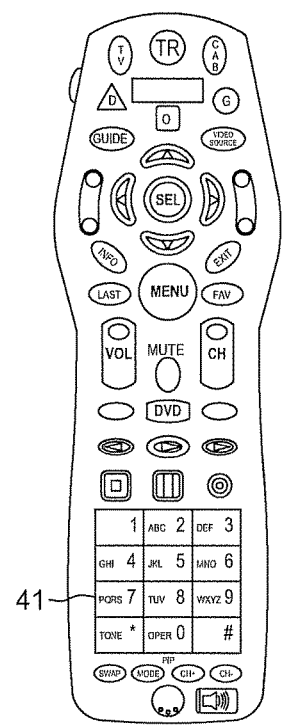
FIG. 4 is a front view of the embodiment of the handheld combination television remote control and wireless telephone apparatus of FIG. 1, showing a touch screen display displaying a telephone alphanumeric dialer.
Figure 9:
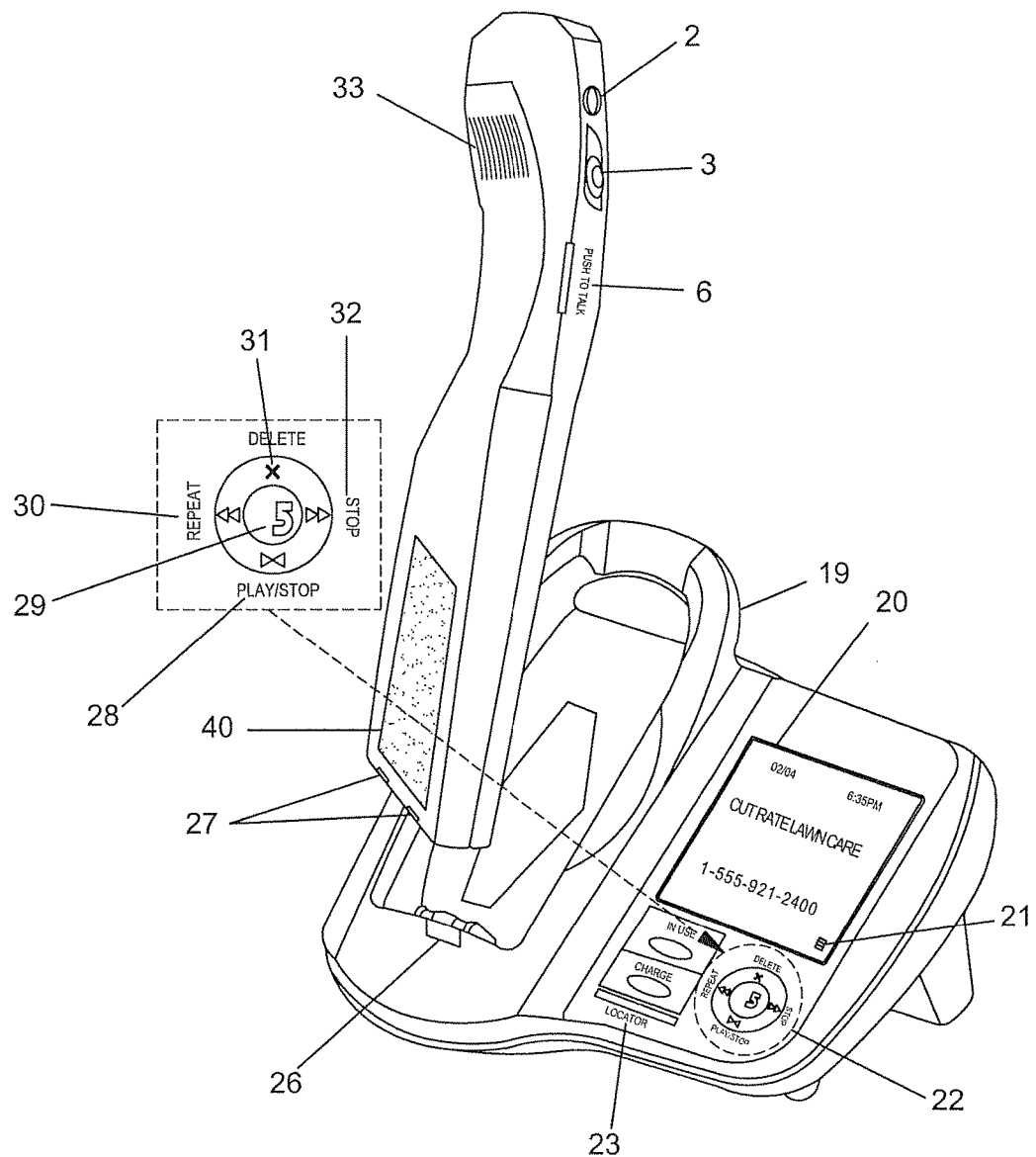
Figure 10:
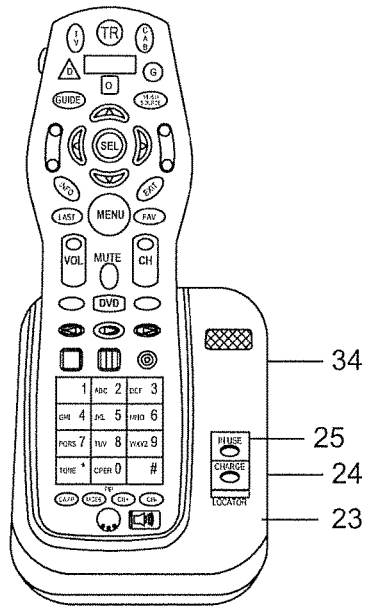
Figure 11:
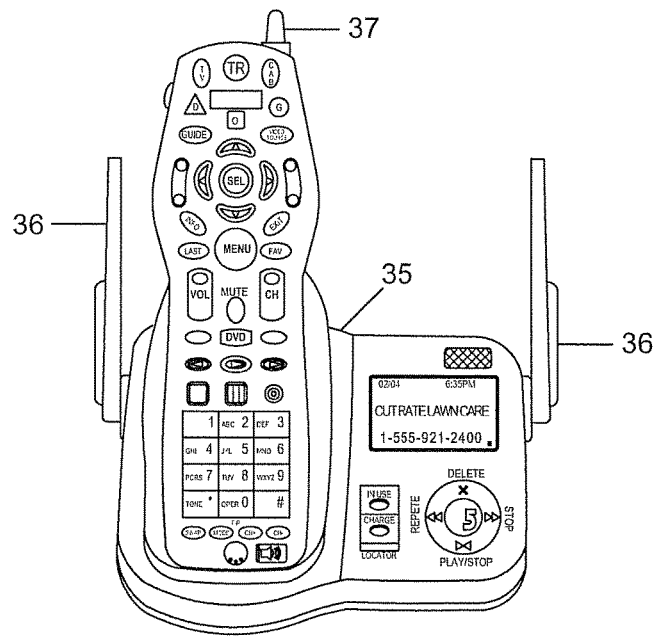
Figure 12:
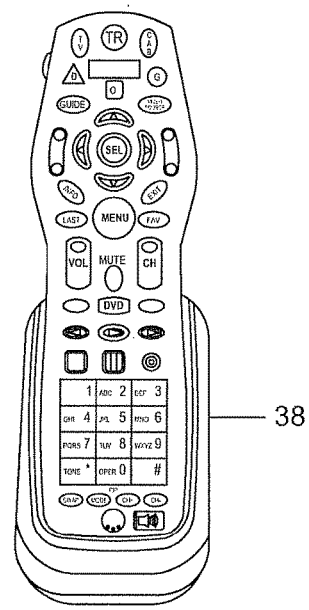

FIG. 9 is a rear perspective view of the embodiment of the handheld combination television remote control and wireless telephone apparatus of FIG. 1 above the base station combination television remote control and wireless telephone apparatus and charger, the handheld combination television remote control and wireless telephone apparatus having a touch screen display on the rear of the handheld combination television remote control and wireless telephone apparatus;

FIG. 10 is a front perspective view of the embodiment of the handheld combination television remote control and wireless telephone apparatus of FIG. 1 mounted on a charger;

FIG. 11 is a front perspective view of the embodiment of the handheld combination television remote control and wireless telephone apparatus of FIG. 1, having an external antenna, mounted on a base station combination television remote control and wireless telephone apparatus and charger, having external antennas; and FIG. 12 is a front perspective view of the embodiment of the handheld combination television remote control and wireless telephone apparatus of FIG. 1 mounted on an alternate charger.

DESCRIPTION

The preferred embodiments of the present invention will be described with reference to FIGS. 1-12 of the drawings. Identical elements in the various figures are identified with the same reference numbers.

FIG. 1 shows a block diagram of an embodiment of the present invention, a handheld combination television remote control and wireless telephone apparatus 50, comprising: a microprocessor 52 comprising embedded firmware; an infrared remote control transceiver 54; an infrared radiator and an infrared sensor 56, each connected to the infrared remote control transceiver 54; a wireless telephone transceiver 58; a wireless telephone antenna 60 connected to the wireless telephone transceiver 58; a Wi-Fi and Bluetooth or other suitable communications transceiver 62; a Wi-Fi and Bluetooth or other suitable communications antenna 64 connected to the Wi-Fi and Bluetooth or other suitable communications transceiver 62; a combination television remote control and telephone keypad 66 communicating with the microprocessor 52; a touch screen display 68 communicating with the microprocessor 52; a microphone 70 communicating with the microprocessor 52; a loud speaker 72, the microprocessor 52 communicating with the loud speaker 72; a power source 74 powering the microprocessor 52, the infrared remote control receiver 54, the wireless telephone transceiver 58, and the Wi-Fi and Bluetooth transceiver 62; and a housing, preferred embodiments of which are shown in FIGS. 2-5.

The microprocessor 52, the infrared remote control transceiver 54, the wireless telephone transceiver 58, the Wi-Fi and Bluetooth transceiver 62, and the power source 72 are within the housing. The combination television remote control and telephone keypad 66 and the touch screen display 68 are mounted to the housing and accessible from the exterior of the housing. The touch screen display 68 and the combination television remote control and telephone keypad 66, which comprises television remote control keypad keys and telephone alphanumeric keypad keys, communicate with the microprocessor 52 to direct the handheld combination television remote control and wireless telephone apparatus 50 to communicate with a remote television, a remote set top box, a wireless telephone system provider, a wireless network, a Bluetooth device, and a base station combination television remote control and wireless telephone apparatus and: switch the handheld combination television remote control and wireless telephone apparatus 50 from television mode to telephone mode and vice versa; control the remote television and/or the remote set top box; control remote television and/or remote set top box settings and retrieve information therefrom; originate and/or receive telephone calls; transmit and/or receive internet information via the wireless network.

FIGS. 2-5 show front views of preferred embodiments of the handheld combination television remote control and wireless telephone apparatus.

FIGS. 7-12 show preferred embodiments of a combination television remote control and wireless telephone system, comprising: a handheld combination television remote control and wireless telephone apparatus and a base station combination television remote control and wireless telephone apparatus.

The combination television remote control and wireless telephone system, comprises: a handheld combination television remote control and wireless telephone apparatus and a base station combination television remote control and wireless telephone apparatus.

The handheld combination television remote control and wireless telephone apparatus of the combination television remote control and wireless telephone system, comprises: a microprocessor comprising embedded firmware; an infrared remote control transceiver; an infrared radiator and an infrared sensor, each connected to the infrared remote control transceiver; a wireless telephone transceiver; a wireless telephone antenna connected to the wireless telephone transceiver; a Wi-Fi and Bluetooth transceiver; a Wi-Fi and Bluetooth antenna connected to the Wi-Fi and Bluetooth transceiver; a combination television remote control and telephone keypad communicating with the microprocessor; a touch screen display communicating with the microprocessor; a microphone communicating with the microprocessor; a loud speaker, the microprocessor communicating with the loud speaker; a power source powering the microprocessor, the infrared remote control receiver, the wireless telephone transceiver, and the Wi-Fi and Bluetooth transceiver; and a housing.

The microprocessor, the infrared remote control transceiver, the wireless telephone transceiver, the Wi-Fi and Bluetooth transceiver, and the power source are within the housing. The combination television remote control and telephone keypad and the touch screen display are mounted to the housing and accessible from the exterior of the housing. The touch screen display and the combination television remote control and telephone keypad, which comprises television remote control keypad keys and telephone alphanumeric keypad keys, communicate with the microprocessor to direct the handheld combination television remote control and wireless telephone apparatus to communicate with a remote television, a remote set top box, a wireless telephone system provider, a wireless network, a Bluetooth device, and the base station combination television remote control and wireless telephone apparatus and: switch the handheld combination television remote control and wireless telephone apparatus from television mode to telephone mode and vice versa; control the remote television and/or the remote set top box; control remote television and/or remote set top box settings and retrieve information therefrom; originate and/or receive telephone calls; transmit and/or receive internet information via the wireless network; the base station combination television remote control and wireless telephone apparatus communicating with a telephone system provider;

The base station combination television remote control and wireless telephone apparatus, comprises: another microprocessor comprising other embedded firmware; another wireless telephone transceiver; another wireless telephone antenna connected to the other wireless telephone transceiver; a telephone message recorder, the other microprocessor communicating with the telephone message recorder; a handheld combination television remote control battery charger; a handheld combination television remote control and wireless telephone apparatus locator communicating with the handheld combination television remote control and wireless telephone apparatus; another touch screen display communicating with the other microprocessor; another microphone communicating with the other microprocessor; another loud speaker, the other microprocessor communicating with the other loud speaker; another power source powering the other microprocessor and the other wireless telephone transceiver; and another housing.

The other microprocessor, the other wireless telephone transceiver, the telephone message recorder, and the other power source are within the housing. The other touch screen display is mounted to the other housing and accessible from the exterior of the other housing. The other touch screen display communicates with the microprocessor to direct the base station combination television remote control and wireless telephone apparatus to communicate with the remote television, the telephone system provider and the handheld combination television remote control and wireless telephone apparatus and originate and/or receive telephone calls.

FIGS. 1-12 show embodiments of the present invention. The present invention relates to a TV remote apparatus and, more particularly, to a land line wireless phone apparatus serving a dual function, having in combination the two into one apparatus, whereby the TV remote control is used to both answer and receive telephone calls.

Referring to the drawings and particularly to FIGS. 1-12, a television remote handset having functions to change television channels, record DVR videos, adjust sound, and other functions, is combined with that of a wireless phone handset having telecommunications functions, such as being a wireless phone. The combination television remote and telephone has at least one designated function key 1 shown preferably as "TR" on the front face of the handset, shown in FIG. 5 and which is used to transform the handset from phone to television remote control and vice versa. The designated TR function key 1, once pressed turns the television remote into a wireless phone. Upon completion of the call, the remote control handset reverts back to its default state of being a television remote control in one of three ways, such as being cleared by user by pressing the TR key 1, which returns the handset to its default state of TV remote, or by pressing an on/off key, which will also result in returning the handset to its default state of television remote, or by placing the handset into its base unit shown in FIGS. 7-12, which is equivalent to hanging up a telephone and which also results in returning the handset to its default state of being a television remote control. Each of the keys on the television remote continue to work and function as they currently do until such time as the TR key 1 is pressed to either answer an incoming call or to make an outgoing call, at such time when the TR key 1 has been pressed, the keys to the remote control now take on the functions of that of the user's current wireless or land line phone. Some keys are common and will allow the handset to be in a telephone mode or a television remote control mode.

Figure 5:
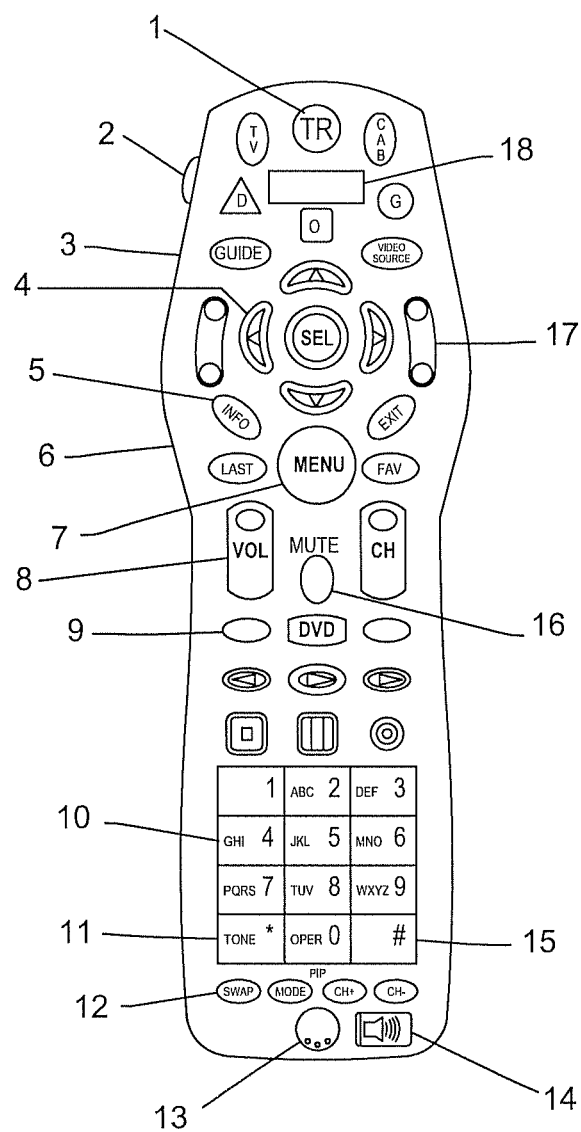
FIG. 5 is a front view of an alternate embodiment of the handheld combination television remote control and wireless telephone apparatus of FIG. 1, showing a telephone keypad having a telephone alphanumeric keypad dialer.
Figure 6:
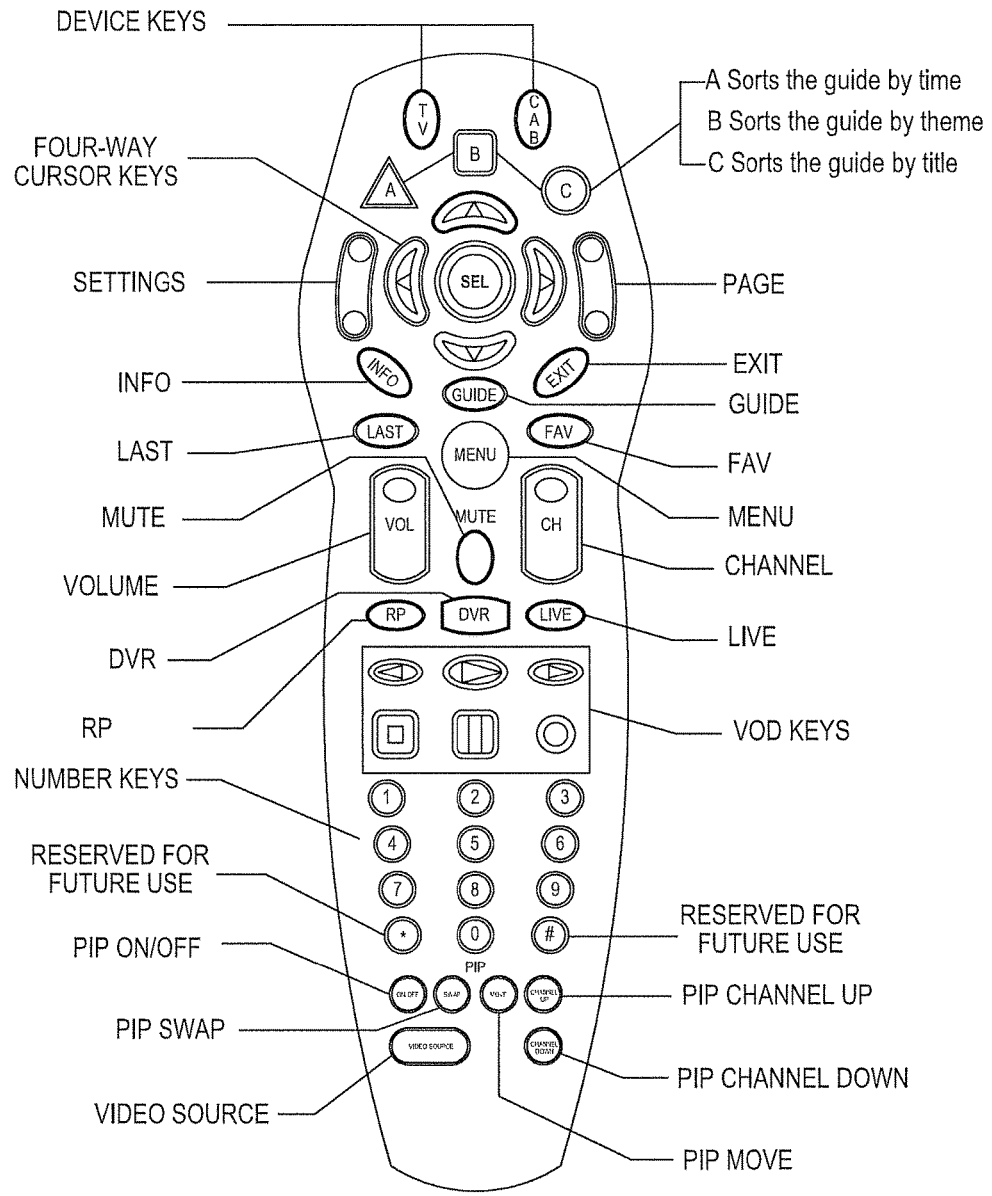
FIG. 6 is a front view of a typical prior art handheld television remote control, showing function keys of the prior art typical handheld television remote control.

FIG. 5 is a comprehensive front view of the combination remote control and telephone invention diagramming and explaining the functions of the newly added keys and features along with the diagramming and explaining of the dual functions of already exiting keys; showing the following enumerated function keys and indicia:

1. TR key
2. call/wait 1 headphone jack
4. 4-way cursor keys
5. info key
6. Push to Talk (PTT)
7. menu key
8. vol key (volume)
9. redial key
10. numbers 1-9 and 0
11. tone * key
12. on/off key
13. microphone
14. Speaker phone key
15. # (pound key)
16. mute key
17. page key
18. receiver For example, as shown in FIG. 5, reference numeral 1 represents the TR button. This is the button added to the remote control unit, which, when pressed, converts the television remote control into a wireless phone. Pressing TR button 1 is used to make or receive a phone call. When button 1 is pressed the user will hear a dial tone and the remote control now begins to function as a wireless phone, and continues to do so, until the call ends in one of three ways; such as when the on/off key is pressed, when the combination remote control and telephone is hung up after having been placed back into its base unit, or when pressing the TR key button 1 again, to end the call, and revert back to a television remote control.

A call/waiting button 2 shown in FIG. 5 is used when the user subscribes to call waiting service from a telephone service provider. The user currently hears an alert tone when there is another incoming call while the user is on another call. The combination remote control and telephone has an alert device, such as, for example, blinking red or other designated color light 2, which is also shown in FIG. 5, and which alerts the user along with the alert tone. By simply pressing the blinking red light button 2, the user puts the current call on hold and takes the new call. Pressing the red light button 2 at any time is used to switch back and forth between calls or for pressing, holding and waiting for an audio beep or other signal to join all parties in conversation. Pressing the red blinking light button 2 allows the user to use other special features, such as transferring an extension call.

A headphone jack in the side of the unit is shown as reference numeral 3, wherein connecting a headphone to the combination remote control and telephone handset allows for hands-free phone conversations, and also works with Bluetooth or other suitable communications functions.

Cursor adjustment keys 4 shown in FIG. 5 allow the user to navigate through a menu along with the display window. If the menu key 7 is pressed in the television remote mode, the user gets a menu on the television screen (or on the visual display/touch screen provided in the base station, or on the combination handheld remote control and telephone unit, from which the user can use the multiple use 4-way cursor keys 4, to select a program to view.

However when the menu key 7 is pressed in telephone mode, the user gets a telephone directory and options to choose to do with making, deleting saving or listening to calls. To get to telephone from the default, the combined remote control and telephone unit's TR button 1 (shown in FIG. 5) is pressed, and when the user hears a dial tone, the user presses the menu button 7, so that the telephone dial tone will end but the remote control menu will appear.

Information key 5, shown in FIG. 5, displays channel and program information while being used as a television or other visual display remote control, and program information appears on the television screen, but also with phone menu options on the display of the base station unit when being used as a wireless phone.

A Push to talk button 6 provided on the unit to be pressed to begin a broadcast to any number of additional combination remote control and telephone handsets in the user's home. Pressing and holding Button 6 broadcasts the user's voice to a group of telephone callers, all at once. The intercom feature allows for conversations between two combination remote control and telephone handsets. This feature is available only if the user has two or more combination remote control and telephone handsets. Users can directly broadcast messages from one combination remote control and telephone handset to the speakerphone of one or multiple combination remote control and telephone handsets, by pressing and holding Push to Talk (PTT) button 6 to begin two-way communication. Only one combination remote control and telephone can talk at a time. To do so, the user presses and holds PTT button 6 while the user is talking. The user releases PTT button 6, to allow the other person to respond.

Menu key 7 is pressed to show the menu in the TV remote mode, so that information appears on the television screen. While using the menu button 7, the user presses to choose an item to watch. If the user enters the menu while in wireless phone mode the phone option menu is displayed on the display window 20 of the base station unit 19 (shown in FIG. 7). The user uses the 4-way cursor keys 4 in FIG. 5 to navigate through the menu to delete, play, repeat, skip or save an entry or setting.

Figure 7:
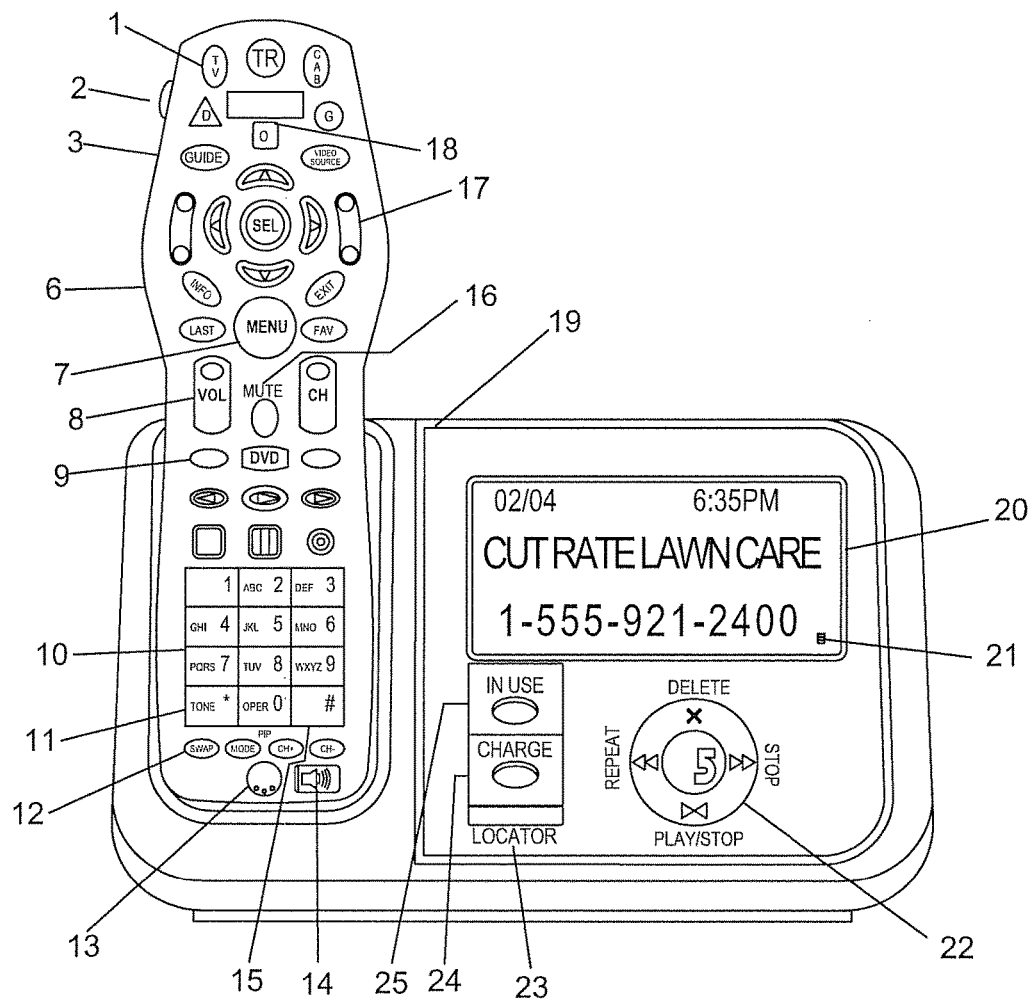
FIG. 7 is a front perspective view of the embodiment of the handheld combination television remote control and wireless telephone apparatus of FIG. 1 mounted on a base station combination television remote control and wireless telephone apparatus and charger.

During a call or message playback, the user presses volume control 8 to increase or decrease the listening volume (shown in FIGS. 5 and 7).

As also shown in FIGS. 5 and 7, dial button 9 is used to press twice in quick succession and the very last entry is dialed. Pressing and holding dial button 9 by the user causes it to enter a list of a plurality of stored numbers. Entries are shown in reverse chronological order, when there are a maximum number of entries, the oldest entry is deleted to make room for the new entry and the user may use this feature along with the display window on the base station. When pressing and holding the redial key, the list will display on the display window, and the user can use the way cursor keys 4 to navigate to the desired redial number, and, upon selecting the desired number, pressing the redial key 5 and the unit dials the selected number.

The combination remote control and telephone is preferably provided with dial pad 10 with dialing numbers. The dial pad 10 can be an array of physical buttons to be used, or can be a simulated dial pad provided on the optional touch screen/display, wherein either real or simulated dial pad 10 can also be provided on the base unit shown in FIGS. 7-12, so that the base unit can function alternatively in the same manner as the handheld handset unit shown in FIG. 5.

Tone* key 11 is used for functions like temporary tone dialing, should the user have a rotary phone, but need to send touch tone signals, and functions for transferring calls between various combination remote control and telephone handsets. The user can add or delete the number from caller ID, when saving numbers to the user's phone directory. Reference numeral 12 is provided for an on/off button, which can be pressed upon completion of a call to hang up. If the combination remote control and telephone is ringing, pressing on/off button 12 temporarily silences the ringer. When scrolling through a menu, pressing the on/off button 12 is used to go back to a previous menu or pressing and holding the on/off button 12 is used to revert back to the default state of being a remote control for a television or other visual display.

Microphone 13 is provided to convert the user's voice into an electrical signal, so that it may be transmitted to the other party on the line.

A speaker phone key 14 is pressed to make or answer a call in the base station when acting as a speaker phone. During a call pressing this key 14 allows switching back a forth between the speaker phone and the remote control feature. Pressing and holding the speaker phone key when the combination remote control and telephone is still in a phone mode, will end a call and a dial tone is provided to make another immediate call. However to return to the remote control feature, the user presses the TR key 1 and the combination remote control and telephone handset will give an audio signal, such as a beep, indicating the switch is complete. Pressing again after the beep returns the remote control feature back to telephone mode and results in a dial tone.

Pressing a pound symbol key 15 repeatedly indicates dialing options when reviewing a caller ID log entry and is used if saving a caller's information to a caller directory, so that when pressed, the unit switches the order the names appear in. Mute button 16 turns the volume off both for the remote control state and for the telephone state of the combination remote control and telephone handset.

Page key 17 moves the menu forward and backward one page when pressed in menu mode in either phone mode or remote mode. However, to enter the menu in general, the user presses the menu button 7, while in the menu, to choose an item, or save an entry or setting. This feature is used along with the display window 20, shown in FIG. 7 on the base unit 19. The 4-way cursor keys 4 are used to navigate through the menu. The menu the user enters will be determined by the function state (remote control state or telephone state) that the combination remote control and telephone is in when the menu button 7 is pressed. If in the default state of being a television remote control unit, the user enters the television menu, but if in the telephone state by having pressed the TR key 1 and having heard a dial tone, after pressing the menu button 7, the dial tone will end but the phone menu will appear on display window 20 of base unit 19 shown in FIG. 7.

An audio receiver 18 in the unit permits two or more users to conduct a conversation when they are not in the same vicinity of each other to be heard directly. This added feature allows the user to hear the person on the other end. The receiver 18 becomes operable once the TR button 1 is pressed which then turns the television remote unit into a telephone.

Figure 8:
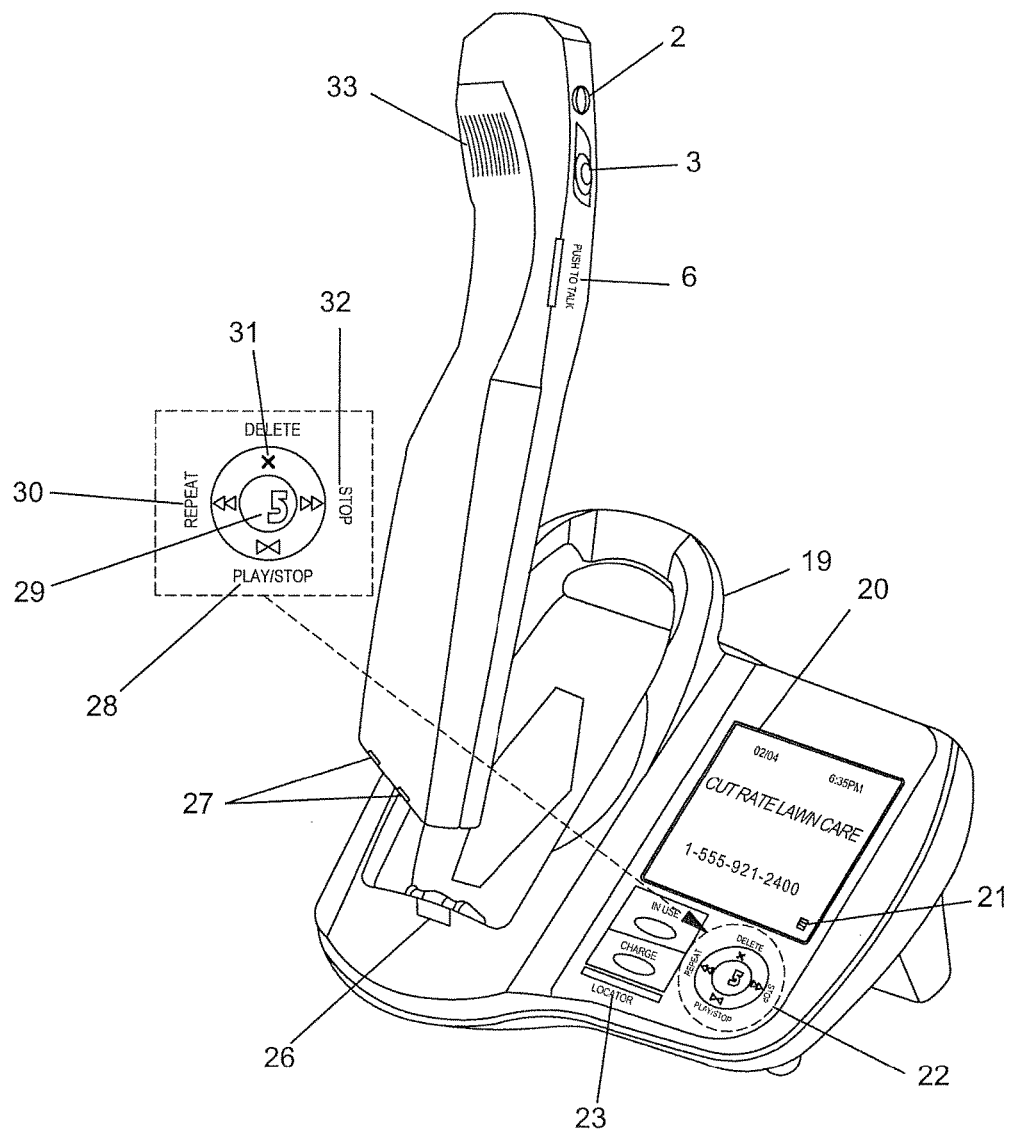
FIG. 8 is a rear perspective view of the embodiment of the handheld combination television remote control and wireless telephone apparatus of FIG. 1 above the base station combination television remote control and wireless telephone apparatus and charger.

FIG. 5 is a front view of the present invention, which is a television remote control handset/wireless phone handset in combination. FIG. 7 shows the handset with base station and its features, which are shown in FIG. 5 according to the following reference numerals representing the following features and keys of the combination remote control and telephone of the present invention, as follows:

1. TR key
2. call/wait key
3. headphone jack
6. Push to Talk (PTT)
8. vol key (volume)
9. redial key
10. number keys 1-9 and 0
11. * tone key
12. on/off key
13. microphone
14. speaker phone key
15. # (pound key)
16. mute key
17. page key
18. receiver
19. base unit
20. display
21. battery level
22. navigator
23. locator FIGS. 8 and 9 are exploded views showing the handheld combination remote control and telephone, and are used to better show the features not clearly visible in FIG. 5 although mentioned, as the following features shown by the following reference numerals:

2. call/wait
3. headphone jack (side Wen)
6. Push to Talk (PTT)
19. base unit
20. display
21. battery level
22. navigator
23. locator
24. charge alert
25. in use alert
26. charge contacts 27, charge contacts
28. play/stop
29. missed call alert
30. repeat
31. delete
32. skip
33. speaker FIGS. 7-12 show combination remote control and telephone handsets housed in several base charge units 34, 35, 38 and 39. For example, FIGS. 10 and 12 show the handheld combination remote control and telephone with respective base unit 34 (shown in FIG. 10), base unit 38 (shown in FIG. 12), base unit 35 (shown in FIG. 11) and base unit 39 (shown in FIGS. 7 and 8). Antennas 36 are shown in FIG. 11. FIG. 11 also shows a ringer indicator 37, which helps the user identify who is calling by using different color ringers for different callers. Once each phonebook entry has a ring color assigned when a call is received from a caller stored in the phonebook who was assigned that color, the visual ringer 37 changes to the assigned color. The default color for visual ringer 37 is yellow, wherein all calls not assigned a personal color rings with the default yellow color shown in visual ringer 37.

It is further noted that visual ringer 37 may be combined with different audio tones for different selected callers, or, for the hard of hearing, the units can be provided with alternative vibration modes, in addition to audio and visual ringer indicators.

It is noted that the combination remote control and telephone can be provided in a set of multiple units, where, base units with touch screens and dial pads can be provided (such as in FIGS. 7 and 8), where other units can be provided in sub-base units for charging only, such as shown in FIGS. 10 and 12. These sub-units are a step down from the main base station units shown in FIGS. 7 and 8, wherein the base station units can also function as both speakerphones, in the absence of the hand held unit, and can also function as remote controls to control a television or other video display, by use of either tangible keys provided thereon, such as the keys noted in FIG. 5, or can be operated by touch screens with the same function on the bas unit as on the handheld remote unit shown in FIGS. 7 and 8.

As indicated by FIG. 10, the sub unit base 34 can have the minimal features of a locator key 23, an in use alert light 25, and a charge alert light 24. These sub-units 34 and 38 shown in FIGS. 10 and 12 may be used when there are more than one combination remote control and telephones in cases when the master unit already has a base unit, such as base units 35 and 39 of FIGS. 7 and 8. Preferably combination remote control and telephone with a different phone number has its own respective base station unit 19 with both remote control and telephone capabilities, such as base units 35 and 39 shown in FIGS. 7 and 8 respectively. In cases where the remote is in a child's room the telephone phone feature can be disabled and an accessory sub-unit 38 shown in FIG. 6B would be sufficient.

In summary, as shown in FIGS. 7 and 8, the base units include at least the following elements indicated by the following reference numerals:

34. combination remote control and telephone with Sub unit
35. combination remote control and telephone with base unit model 2
36. antenna featured on model 2
37. color ringer
38. combination remote control and telephone with accessory unit
39. combination remote control and telephone with base unit model I
40. touch screen rear mounted
41. touch screen numbers keys
42. touch screen live TV
43. touch screen incoming call notification The primary function of the base unit 19 is to maintain the battery charge and provide a home base for the combination remote control and telephone when not in use. While charging, the charge indicator 24 on the base unit lights up. When the battery is fully charged, the charge indicator light goes off. The combination remote control and telephone may be left on the base unit (or charger) without any ill effect on the battery.

However, preferably base station 19 has remote control and telephone capabilities. For example, display screen/window 20 shown in FIG. 7 is located on the front face of the base unit. This display unit can also be preferably provided with touch screen options. This display window 20 is used to enter a menu for both the television remote and wireless phone states of the combination remote control and telephone handset. The display 20 may show error alerts and other functions like save, delete, and/or skip menu items can be accessed in phone mode. However in the television remote control mode access is given to programs to select for watching or recording. In its default television remote state the menu on the display 20 displays the date, time, battery level and the number of the combination remote control and telephone handset. For example if the user has several handsets, one would be TRI, the second TR2 and so on.

When there's an incoming call, the display features the identity of the caller, the user can answer the call in several ways; the display window is actually a touch screen so when the identity flashes simply touch the screen and begin talking via speaker phone, don't want speaker phone; lift the remote from the base unit and press the TR key or touch the touch screen and begin speaking into the remote.

Battery level indicator 21 of FIG. 7 is used to alert to the condition of the batteries. Battery power is consumed whenever the combination remote control and telephone is off the base unit or charger, even when the unit is not in use. Hence, the longer the user leaves the combination remote control and telephone off the base unit 19 or charger, the less time the user may actually talk using the combination remote control and telephone handset. An indicator signal, such as, for example, three bars indicates that the unit is fully charged, two bars shows a lesser charged state, one bar indicates a low charge and is an indication that the combination remote control and telephone needs to be charged. While in the low charge state, the combination remote control and telephone handset beeps intermittently while it is in use. The base unit navigator key 22 is used for the following functions; delete, play/stop, repeat and skip. These functions are carried out by pressing the delete, play/stop, repeat, and skip markers located on the navigator.

A locator key 23 found in lower extremity of the base unit and marked locator, has the ability to find the misplaced handheld portion of the combination remote control and telephone. Once the combination remote control and telephone locator button found at the bottom of the base unit and marked locator 23 is pressed, the combination remote control and telephone beeps for a period of time, such as, for example one minute. Once the missing unit is found, and the user want to stop paging, pressing the locator button again while it is still beeping causes the combination remote control and telephone to stop beeping. However, alternatively, in a preferred option, the base unit can have the same functions as the handheld portion, so that the base unit can act as a remote control, and can act as a speaker phone, whereby all of the functions of the handheld portion are also provided in the touch screen display 21 of the base unit. Therefore the base unit can also act as a remoter control for a television or other display, and can also function as a speaker phone telephone.

Charge alert light 25 remains on while batteries are being charged. and will go off when charge is complete. There are no ill effects to the combination remote control and telephone if left in base unit after charge. It is recommended that it is stored in the base unit when not in use. A separate indicator light can let the user know the combination remote control and telephone is in use as a phone somewhere. This use indicator light only comes on when call is made or received, and remains on as long as combination remote control and telephone is in phone mode.

Charge contacts 26 are located on the cradle of the base unit and are necessary to charge the combination remote control and telephone handset. Reciprocating charge contacts 27 are located on the bottom of the combination remote control and telephone handset and are necessary to charge the combination remote control and telephone handset.

Play/Stop message playback 28 is located on the base unit, so if the user has new messages, the telephone plays only the new messages (oldest first). If there are no new messages, the telephone plays back all messages (oldest first). On the combination remote control and telephone handset, if the user has both new and old messages, the user can play either new or old messages. Pressing the TR button 1 then the menu button 7 causes the caller ID information to be displayed on the base unit display 21. As the user plays messages, the user can call back the caller if the user choose to. When playback begins, the user hears the total number of messages followed by the day and time of the message. After the last message, the combination remote control and telephone base unit announces the end of messages. To play messages with the base unit, the user presses the play/stop button when the combination remote control and telephone is not in use and in phone mode.

If a missed call is not answered, the unit treats the call as a missed call. The number of missed calls is displayed on the base station unit, in the center of the navigator, at indicator 29. This lets the user know if the user should view the caller list to see who called while the user were out, or the uses presses play on the navigator 22. Along with the bright red number in the center of the navigator 29 key located on the base unit 19, the combination remote control and telephone also beeps every 10 seconds to alert the user of new messages. The tone will discontinue after all new messages have been reviewed by playing either the Play/stop, delete or skip key. The unit lets the user know that the user have new Voice Mail messages in the following ways: Voice Mail is displayed on the base unit display. The call wait light indicator on the combination remote control and telephone handset flashes slowly. In addition to the conventional aforementioned features above, a user may utilize the combination remote control and telephone in a way common to the existing TV remote and or the current wireless phone. (See hand book for more details.)

Repeat button 30 is used to replay messages from the beginning. Pressing and holding replay button 30 repeats and plays all stored messages. If repeat button 30 is pressed while message is playing, the message being reviewed will be repeated from beginning. Press repeat b twice to listen to the previous message.

Delete button 31 deletes missed or saved calls, and also allows the user to delete entries from the phone menu by pressing to delete the message currently playing. The system advances to the next message or entry once a message or entry is deleted.

Skip button 32 is used to skip to the next message, and also allows the user to skip entries from the phone menu.

The microphone speaker 33 is used for sound output, and also allows the user of the combination remote control and telephone to hear the person on the other end.

Optionally, sub-units for charging may serve as a home and charger for the combination remote control and telephone, but this limits the options of the user, and are used for guest rooms or rooms with small children.

In another embodiment of the combination remote control and telephone, there may be provided an antenna, which are needed for analog roaming capabilities.

A color ringer helps the user identify who is calling by using different color ringers for different callers. Once each phone book entry has a ring color assigned to specified callers, when a call is received from a caller stored in the phone book, who was assigned that color, the ringer changes to the assigned color. The default color is the yellow, all calls not assigned a personal color ring with the default yellow color.

The base station unit 19 may be portable and movable, or may be wall mounted, or mounted to a horizontal surface, such as a tabletop or shelf.

The hand held remote control and telephone, and/or the base, may have a built-in projector and/or a projector interface, which may be used to project images generated by the remote television and/or remote set top box, or other suitable source.

When used as a projector of images on a wall, the combination remote control and telephone base station can be used as a stand to hold the combination remote control and telephone, while using the image projector feature.

In such a case, a projector window 40 is used to project movies or shows on the wall. The remote has further function of acting as a movie projector by simply selecting the show the user want to appear on the front face of the remote control, then pressing the "pr" or projector button, flipping and pointing the back of the remote at a light colored flat wall or on a surface, which allows the user to watch the user show or movie, in full color, and being large enough so that the user feels like being in the scene. The base station unit can function as a prop to hold the combination remote control and telephone in place, at just the right angle, for optional viewing, using the special adjustable brace.

Touch screens 41-44 are provided, specifically in three versions for numbers key pad for live TV, and for incoming call alert/caller ID.

When using Screen Navigation, the key pad is the remote control default screen, but to get to the live television, the user simply presses and holds the PTT button 6 and holds the screen for several seconds and the desired television station is shown for the user to currently watch on the television screen, or on the touch screen of the combination remote control and telephone.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

While the invention can be described in various modifications and alternate models, a specific embodiment thereof has been shown by way of example and drawings and will herein be described in detail. It should be understood, however, that there is no intent to limit the invention to the particular form or model disclosed, but on the contrary, the invention is to cover all modifications, equivalents, and alternatives falling within the spirit and scope of the invention as defined by the claims.

Although the present invention has been described in considerable detail with reference to certain preferred versions thereof, other versions are possible. Therefore, the spirit and scope of the appended claims should not be limited to the description of the preferred versions contained herein.

What is claimed is:

1. An improved television remote control and an improved base station of the type in which an infrared handheld television remote control apparatus, for use with a television, has a plurality of push buttons having a channel key, a volume key, a menu key, and numbers zero through nine keys, wherein the improvement comprises: said infrared handheld television remote control apparatus and said base station each comprising: a built-in firmware based dedicated microprocessor communicating with a land line cordless telephone provider providing telephone communications to third parties, an infrared remote control transceiver; an infrared radiator and an infrared sensor, each connected to said infrared remote control transceiver; a wireless cordless telephone transceiver; a wireless land line telephone antenna connected to said wireless cordless telephone transceiver; a Wi-Fi and Bluetooth transceiver; a Wi-Fi and Bluetooth antenna connected to said Wi-Fi and Bluetooth transceiver; a combination television remote control and telephone keypad communicating with said built-in firmware based dedicated microprocessor; a touch screen display communicating with said built-in firmware based dedicated microprocessor; a microphone communicating with said built-in firmware based dedicated microprocessor; a loud speaker, said built-in firmware based dedicated microprocessor communicating with said loud speaker; a power source powering said built-in firmware based dedicated microprocessor, said infrared remote control receiver, said wireless cordless telephone transceiver, and said Wi-Fi and Bluetooth transceiver; a housing, said built-in firmware based dedicated microprocessor, said infrared remote control transceiver, said wireless telephone transceiver, said Wi-Fi and Bluetooth transceiver, and said power source within said housing; said combination television remote control and telephone keypad and said touch screen display mounted to said housing and accessible from the exterior of said housing; said touch screen display and said combination television remote control and telephone keypad, which comprises television remote control keypad keys and telephone alphanumeric keypad keys, communicating with said built-in firmware based dedicated microprocessor to direct said handheld combination television remote control and wireless telephone apparatus to communicate with a remote television, a remote set top box, a wireless telephone system provider, a wireless network, a Bluetooth device, and a base station combination television remote control and wireless telephone apparatus and a switch; said handheld combination television remote control and wireless telephone apparatus switching from a television mode to a telephone mode and vice versa to control said remote television and/or said remote set top box; and retrieve information therefrom, and to originate and/or receive telephone calls; transmit and/or receive Internet information via said wireless cordless network of said land line telephone provider while communicating with the Internet through said land line telephone system provider; wherein further said remote control apparatus and said base station each use said dedicated firmware microprocessor to control the base station combination television remote control and wireless land line telephone apparatus communicating with the land line telephone system provider wherein further said remote control apparatus and said base station further comprise an infrared handheld television remote control apparatus mount and charger, said base station firmware based dedicated microprocessor communicating with said land line telephone transceiver and with said infrared handheld television remote control apparatus and a second infrared transceiver and a second RF cordless transceiver, said infrared handheld television remote control apparatus and said base station communicating with a handheld audio output device locator and locating said infrared handheld television remote control apparatus; a microphone and a loudspeaker built into the infrared handheld television remote control apparatus, which communicate audio signals to and from the infrared handheld television remote control apparatus, said wireless transceiver built into the infrared handheld television remote control apparatus, which communicates with the land line telephone system provider via the base station combination television remote control and wireless land line telephone apparatus and vice versa, said base station combination television remote control and wireless land line telephone apparatus each communicating with each other through the land line telephone system provider; said infrared handheld television remote control apparatus and said base station communicating with said television and controlling said television; said base station and said infrared handheld television remote control apparatus communicating with said third party via the cordless land line telephone system and a television projector built into the infrared handheld television remote control apparatus; said remote control apparatus firmware based dedicated microprocessor built into the infrared handheld television remote control apparatus, processes wireless signals received from the television into television display signals compatible with the television projector built into the infrared handheld television remote control apparatus, which projects live television.

2. The improved television remote control apparatus of claim 1, wherein the improvement further comprises: the infrared handheld television remote control apparatus comprises a paddle shaped exterior having a ton half portion wider than a lower half portion.

3. The improved television remote control apparatus of claim 1 wherein said live television is projected onto a remote flat surface spaced apart from said base station.

4. The improved television remote control apparatus of claim 1 wherein said live television is projected onto a viewing screen located upon said base station.

* * * * *